(12) United States Patent
Mascaro et al.

(10) Patent No.: US 8,707,275 B2
(45) Date of Patent: Apr. 22, 2014

(54) SIMULATION ENVIRONMENT FOR DISTRIBUTED PROGRAMS

(75) Inventors: Massimo Mascaro, Redmond, WA (US); Igor Ostrovsky, Bellevue, WA (US); Emad A. Omara, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 691 days.

(21) Appl. No.: 12/882,163

(22) Filed: Sep. 14, 2010

(65) Prior Publication Data

US 2012/0066667 A1    Mar. 15, 2012

(51) Int. Cl.
*G06F 9/44* (2006.01)

(52) U.S. Cl.
USPC ........... 717/135; 717/124; 717/144; 717/126; 717/130; 717/132; 718/102; 705/7.25; 705/7.26

(58) Field of Classification Search
USPC .......... 717/151, 156; 705/7.25, 7.26; 718/102
See application file for complete search history.

(56) References Cited

U.S. PATENT DOCUMENTS

| | | | |
|---|---|---|---|
| 5,038,348 A | 8/1991 | Yoda et al. | |
| 5,602,754 A * | 2/1997 | Beatty et al. | 716/108 |
| 5,966,072 A * | 10/1999 | Stanfill et al. | 340/440 |
| 7,174,536 B1 | 2/2007 | Kothari et al. | |
| 7,734,775 B2 | 6/2010 | Barnett et al. | |
| 2003/0135621 A1* | 7/2003 | Romagnoli | 709/226 |
| 2004/0133876 A1* | 7/2004 | Sproule | 717/105 |
| 2005/0165631 A1* | 7/2005 | Horvitz | 705/7 |
| 2006/0111888 A1 | 5/2006 | Hiew et al. | |
| 2007/0169049 A1* | 7/2007 | Gingell et al. | 717/151 |
| 2008/0079724 A1* | 4/2008 | Isard et al. | 345/440 |
| 2011/0138391 A1* | 6/2011 | Cho et al. | 718/102 |

OTHER PUBLICATIONS

Buntarou Shizuki et al., "Static Visualization of Dynamic Data Flow Visual Program Execution", 2002 IEEE, Computer Society, (6 pages).
Jaroslaw Francik, "Specifying Algorithm Visualizations in Terms of Data Flow", 2002 IEEE, Computer Society, (8 pages).
"Tool: Visual Modeling Framework for Distributed Multiscale, Multiparadigm Simulations", http://wag.caltech.edu/multiscale/multiscale_computations.htm, (2 pages).
Wanqian David Liu, "A Distributed Data Flow Model for Composing Software Services", Jun. 2003, (192 pages).
Ronald A. Olsson et al., "A Dataflow Approach to Event-based Debugging", Software-Practice and Experience, vol. 21(2), pp. 209-229, Feb. 1991.

* cited by examiner

*Primary Examiner* — Lewis A Bullock, Jr.
*Assistant Examiner* — Tina Huynh
(74) *Attorney, Agent, or Firm* — Kevin Sullivan; Brian Haslam; Micky Minhas

(57) ABSTRACT

A scheduler receives a job graph which includes a graph of computational vertices that are designed to be executed on multiple distributed computer systems. The scheduler queries a graph manager to determine which computational vertices of the job graph are ready for execution in a local execution environment. The scheduler queries a cluster manager to determine the organizational topology of the distributed computer systems to simulate the determined topology in the local execution environment. The scheduler queries a data manager to determine data storage locations for each of the computational vertices indicated as being ready for execution in the local execution environment. The scheduler also indicates to a vertex spawner that an instance of each computational vertex is to be spawned in the local execution environment based on the organizational topology and indicated data storage locations, and indicates to the local execution environment that the spawned vertices are to be executed.

23 Claims, 4 Drawing Sheets

US 8,707,275 B2

SIMULATION ENVIRONMENT FOR DISTRIBUTED PROGRAMS

FIELD OF THE INVENTION

The present invention is related to simulation on a local computing environment execution of a software application that is designed for distributed execution among a plurality of different computing systems distributed throughout a network of computing systems, so that performance of the software application can be evaluated prior to actual execution in the environment of the distributed network.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed for distributed processing among a plurality of different computing systems. For instance, some software applications may be designed for processing in a cloud, or a system of distributed, network-connected computers. In such cases, a distributed application may be divided into different portions which may then be processed on different computer systems in the cloud. Testing and monitoring the execution of the application, however, may be obfuscated by the distributed nature of the program.

BRIEF SUMMARY

Embodiments described herein are directed to locally simulating a distributed software application and visualizing dataflow of a distributed application in a locally simulated execution environment. A scheduler receives a job description which includes a graph of computational vertices that are designed to be executed on a plurality of distributed computer systems and a set of binaries that contain the code to be executed for each vertex type. The scheduler queries a graph manager to determine which computational vertices of the job graph are ready for execution in a local execution environment. The scheduler queries a cluster manager to determine the organizational topology of the plurality of distributed computer systems to simulate the determined topology in the local execution environment. The scheduler queries a data manager to determine data storage locations for each of the computational vertices indicated as being ready for execution in the local execution environment. The scheduler also indicates to a vertex spawner that an instance of each computational vertex is to be spawned in the local execution environment based on the organizational topology and indicated data storage locations, and indicates to the local execution environment that the spawned vertices are to be executed.

In another embodiment, a computer system receives a subscription to receive dataflow process data from a dataflow visualizer, where the dataflow visualizer is configured to display various aspects of simulated distributed application execution. The computer system monitors dataflow during execution of the distributed application, wherein the distributed application comprises a plurality of computational vertices that correspond to a job graph of the distributed application. The computer system also sends the monitored dataflow data to the dataflow visualizer for display, where the dataflow data is displayed as the application is being executed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
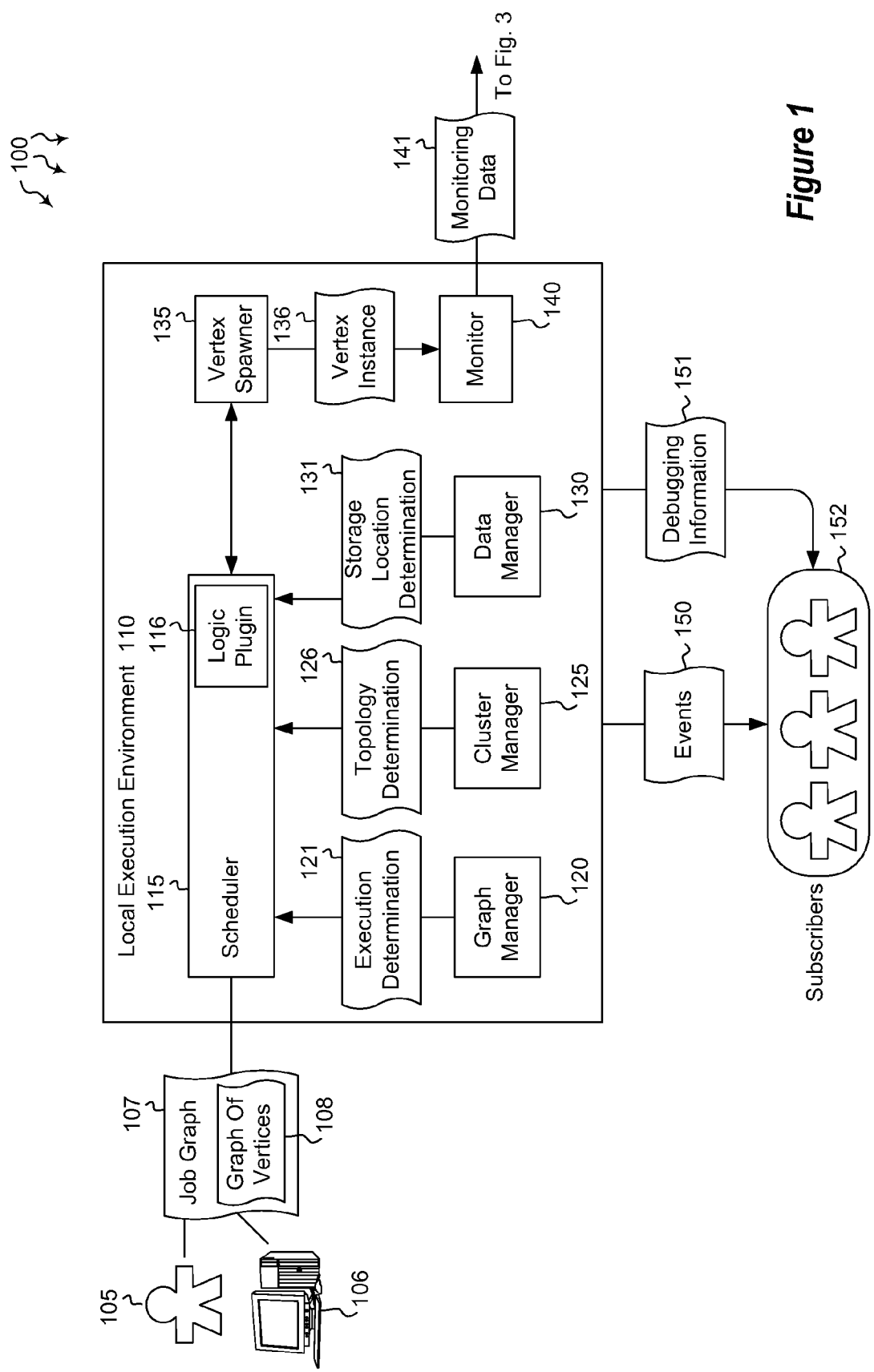
FIG. 1 illustrates a computer architecture in which embodiments of the present invention may operate including locally simulating a distributed software application.

Embodiments described herein are directed to locally simulating a distributed software application and visualizing dataflow of a distributed application in a locally simulated execution environment. A scheduler receives a job description which includes a graph of computational vertices that are designed to be executed on a plurality of distributed computer systems and a set of binaries that contain the code to be executed for each vertex type. The scheduler queries a graph manager to determine which computational vertices of the job graph are ready for execution in a local execution environment. The scheduler queries a cluster manager to determine the organizational topology of the plurality of distributed computer systems to simulate the determined topology in the local execution environment. The scheduler queries a data manager to determine data storage locations for each of the computational vertices indicated as being ready for execution in the local execution environment. The scheduler also indicates to a vertex spawner that an instance of each computational vertex is to be spawned in the local execution environment based on the organizational topology and indicated data storage locations, and indicates to the local execution environment that the spawned vertices are to be executed.

In another embodiment, a computer system receives a subscription to receive dataflow process data from a dataflow visualizer, where the dataflow visualizer is configured to display various aspects of simulated distributed application execution. The computer system monitors dataflow during execution of the distributed application, wherein the distributed application comprises a plurality of computational vertices that correspond to a job graph of the distributed application. The computer system also sends the monitored dataflow data to the dataflow visualizer for display, where the dataflow data is displayed as the application is being executed.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes local execution environment 110. Local execution environment 110 (or environment 110 herein) may be part of a computer system or may be run on various different computer systems. The local execution environment may be run on dedicated or shared hardware and may be designed to imitate a larger, distributed computing environment. Environment 110 includes a scheduler 115, which may interface with various different modules and components. The scheduler may schedule events or tasks to be executed. These tasks may be described in a job graph (e.g. 107).

Job graph 107 includes a graph of vertices 108. As used herein, a graph of vertices refers to a dataflow, graph or other arrangement of tasks that are to be processed as part of a distributed application. In some cases, these tasks are processed in a particular order, such as when tasks are dependent on other tasks. Dependencies and other properties may be defined in the job graph. The job graph may include tasks for a single application, a part of an application, multiple applications or multiple parts of different applications. The scheduler 115 may receive job graphs from various different users (e.g. user 105) or from other computer systems 106.

In some embodiments, the scheduler 115 may be configured to query different local execution environment components to obtain various different determinations. For example, the scheduler may query graph manager 120 to determine which computational vertices (from the graph of vertices 108) are currently ready for execution in the local execution environment 110. The graph manager 120 replies with execution determination 121 indicating which computational vertices are currently ready for execution in the local execution environment.

Scheduler 115 may also be configured to query cluster manager 125 to determine the organizational topology 126 of a particular distributed computing environment. Thus, in cases where job graph 107 is designed for execution in a particular distributed computing environment, scheduler 115 can determine what that environment is from cluster manager 125 and then implement a scaled-down representation of that distributed environment in the local execution environment. Scheduler may also query data manager 130 to determine data storage locations for each of the computational vertices indicated as being ready for execution in the local execution environment. In response to the query, data manager 130 may provide storage location determination 131 to the scheduler, which indicates where the data for the vertices defined in graph of vertices 108 is located. This location information leads to more efficient data retrieval during application execution. In some cases, using the local simulation environment, a developer does not need access to a cluster during (at least a portion of) the development.

Figure 3:
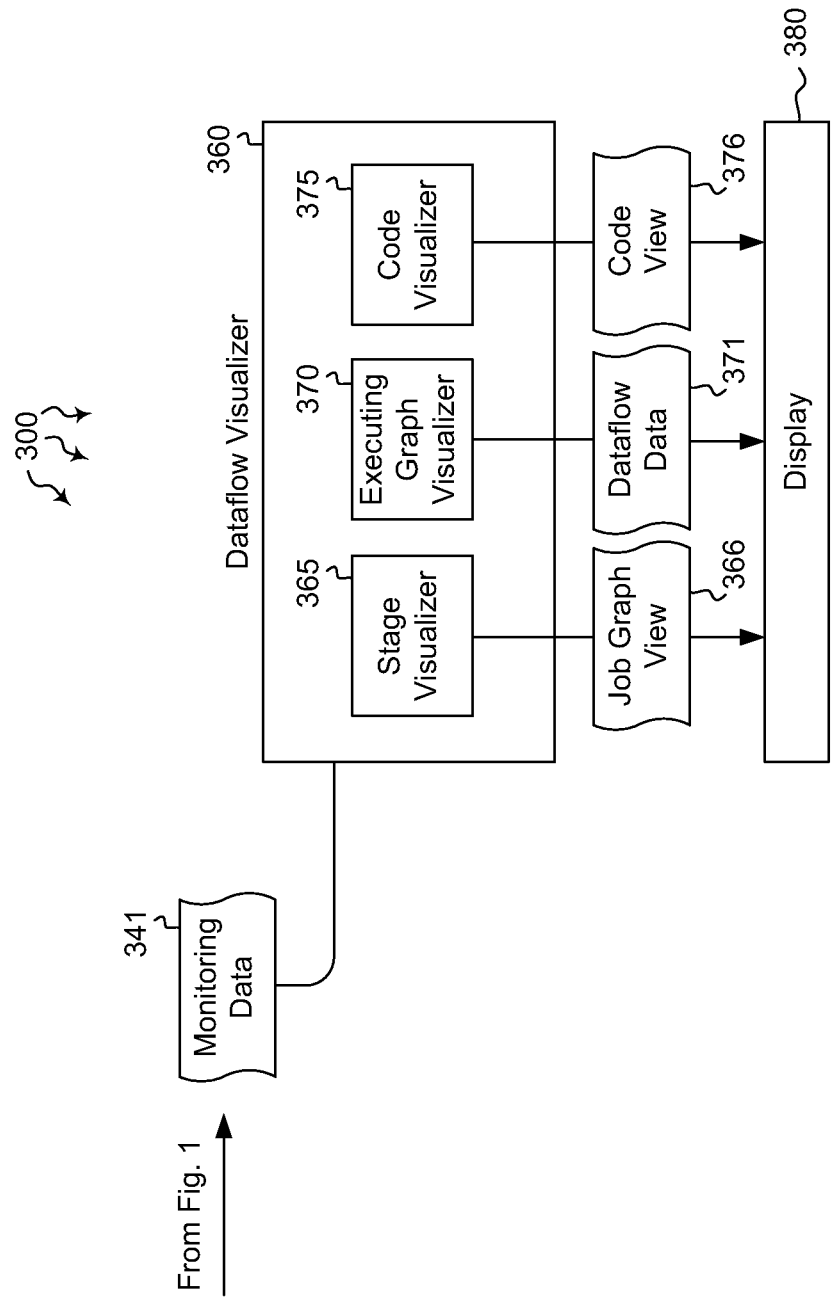
FIG. 3 illustrates a computer architecture in which embodiments of the present invention may operate including visualizing dataflow of a distributed application in a locally simulated execution environment

With the determinations from the various local execution environment components, the scheduler may provide an indication to vertex spawner 135 that an instance of each computational vertex identified in execution determination 121 is to be spawned in the local execution environment based on the organizational topology 126 and indicated data storage locations 131. These spawned vertex instances 136 may be monitored by monitor 140. The monitor may be configured to access each vertex instance and identify tasks, events or other processing details. This monitoring data 141/341 may be sent to a dataflow visualizer 360 (of FIG. 3) and/or to other users or software components (e.g. subscribers 152).

The dataflow visualizer 360 includes various different components including a stage visualizer 365, an executing graph visualizer 370 and a code visualizer 375. Each of these visualizers is configured to provide a different output including a job graph view 366, dataflow data 371 and code view 376, respectively. The views are outputted to display 380, which may be any type of computer monitor or television display. Each of the components and processes mentioned above will be described in greater detail below with regard to methods 200 and 400 of FIGS. 2 and 4, respectively.

Figure 2:
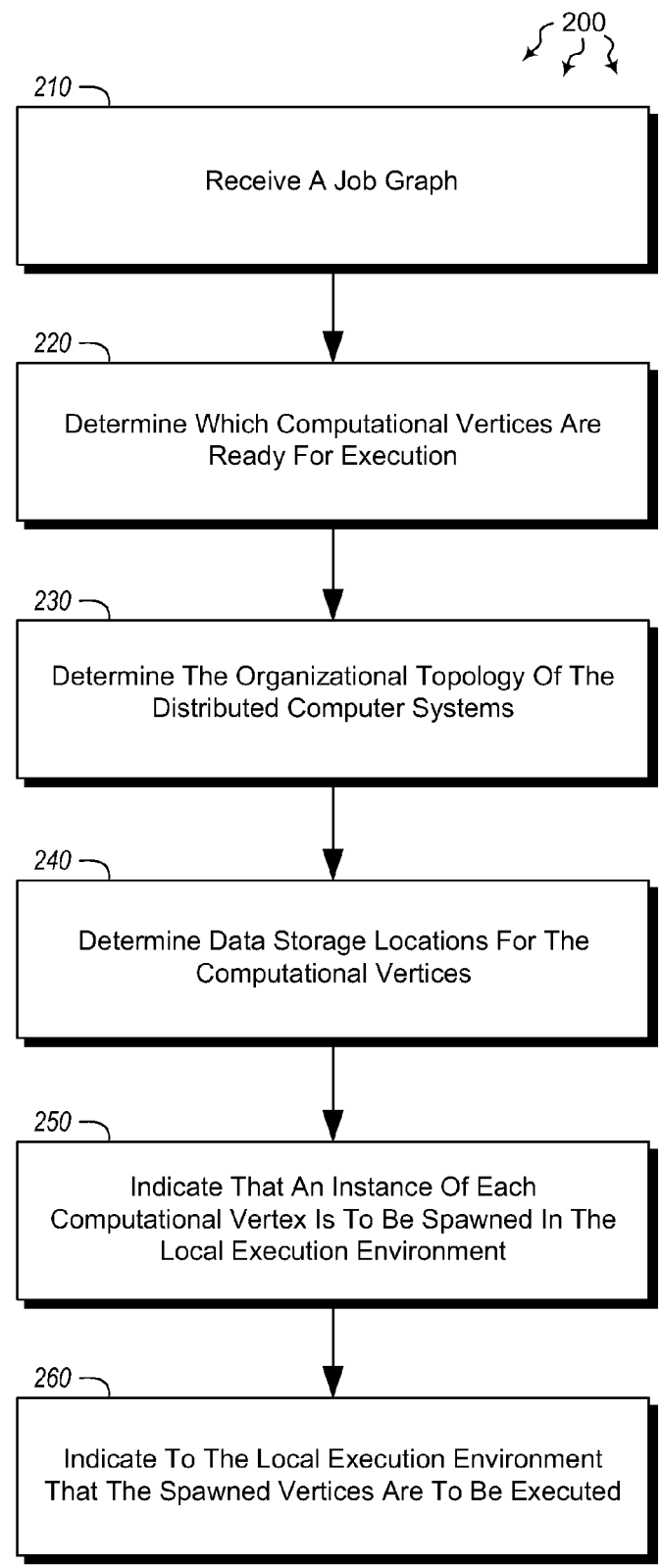
FIG. 2 illustrates a flowchart of an example method for locally simulating a distributed software application.
Figure 4:
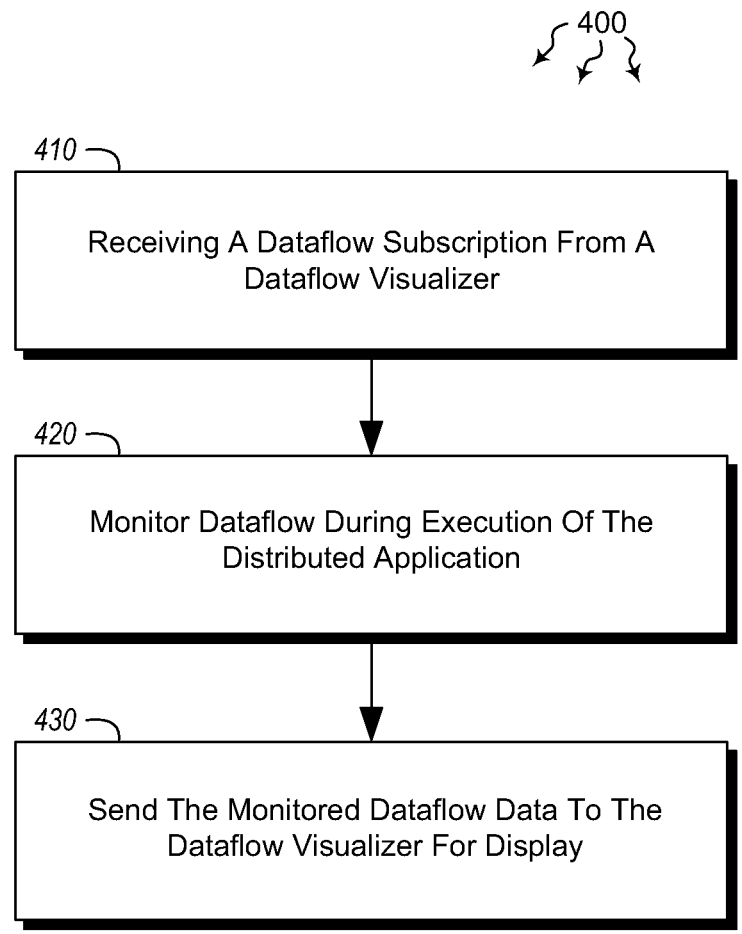
FIG. 4 illustrates a flowchart of an example method for visualizing dataflow of a distributed application in a locally simulated execution environment.

In view of the systems and architectures described above, methodologies that may be implemented in accordance with the disclosed subject matter will be better appreciated with reference to the flow charts of FIGS. 2 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for locally simulating a distributed software application. The method 200 will now be described with frequent reference to the components and data of environment 100.

Method 200 includes an act of receiving at a scheduler a job graph which includes a graph of computational vertices that are designed to be executed on a plurality of distributed computer systems (act 210). For example, scheduler 115 may receive job graph 107 which includes graph of vertices 108 that are configured for execution on multiple different computer systems. The computer systems may be local or remote and may be communicatively connected by a computer network. In some cases, the computer systems may form a distributed system with a specified topology. In cases where the job graph is to be executed on a specific distributed topology, the topology can be received as an input by the scheduler and then implemented in the local execution environment.

Method 200 includes an act of the scheduler querying a graph manager to determine which computational vertices of the job graph are ready for execution in a local execution environment (act 220). For example, scheduler 115 may query graph manager 120 to determine which computational vertices 108 of job graph 107 are ready for execution in local execution environment 110. In some cases, not all of the computational vertices may be ready for execution. For instance, if some of the vertices are entirely dependent on the processing of other vertices, they will not be ready for execution until the vertices upon which they depend are processed. Other circumstances may also lead to a vertex not being ready for current processing. Accordingly, graph manager 120 can poll or use other methods to determine, on a continual basis, which vertices are currently ready for execution.

In some embodiments, the graph manager 120 may dynamically determine which computational vertices of the job graph are ready for execution in the local execution environment based on currently available processing resources. Thus, even if a larger number of computational vertices are ready for processing, the graph manager may determine that, due to a lower amount of available processing resources, only a small number of vertices should be indicated as being ready for processing. As more processing resources become available, the graph manager can increase the number of vertices it indicates as being available for processing.

Method 200 includes an act of the scheduler querying a cluster manager to determine the organizational topology of the plurality of distributed computer systems to simulate the determined topology in the local execution environment (act 230). For example, scheduler 115 may query cluster manager 125 to determine the organizational topology of the distributed computer system on which the job graph was designed to run. In response, cluster manager 125 provides topology determination 126 which indicates the intended organizational topology to the scheduler. In some cases, the cluster manager may be configured to simulate different network topologies, or different combinations of network topologies. As such, the local execution environment is configured to simulate many different types and/or combinations of distributed networks. It should be noted that, at least in some embodiments, scheduler 115, graph manager 120, cluster manager 125, data manager 130, vertex spawner 135 and other components are all simulated on a single computer system.

Method 200 includes an act of the scheduler querying a data manager to determine data storage locations for each of the computational vertices indicated as being ready for execution in the local execution environment (act 240). For example, scheduler 115 may query data manager 130 to determine data storage locations for each of the computational vertices in graph of vertices 108 that were indicated by graph manager 120 as being ready for execution. In some cases, the data corresponding to the computational vertices is stored one various different computer systems, perhaps located in different physical locations. Accordingly, the data manager can determine where the data is currently stored and can move the data for the vertices that are to be processed to a central location or data store. Thus, when the vertices are processed, the data is more easily accessible as it is centrally located.

Additionally or alternatively, the data manager and/or the local execution environment may be able to simulate the positioning of data across different machines. Thus, in cases where it is desirable to test a program that will be run with data scattered across multiple different computer systems, the local execution environment can simulate storing the data in different locations. The local execution environment may also be able to simulate other environments or other ways of processing a job graph. In line with this, scheduler 115 may allow for logic plugins 116 that allow third parties or other users to add or supplant the existing (default) scheduling methods with their own.

Method 200 includes an act of the scheduler indicating to a vertex spawner that an instance of each computational vertex is to be spawned in the local execution environment based on the organizational topology and indicated data storage locations (act 250). For example, scheduler 115 may indicate to vertex spawner 135 that a vertex instance 136 of each computational vertex (e.g. from graph of vertices 108) is to be spawned in the local execution environment 110 based on the organizational topology 126 and indicated data storage locations 131. In some cases, vertex spawner 135 may create a directory structure and corresponding execution data for each computational vertex in the directory. This execution data may be stored with each vertex instance or separately in a data store.

Method 200 includes an act of the scheduler indicating to the local execution environment that the spawned vertices are to be executed (act 260). For example, scheduler 115 may indicate to local execution environment 110 that the spawned vertex instances 136 are to be executed. In some cases, the indicated computational vertices may be executed concurrently in the local execution environment. Such concurrent execution improves processing efficiency. The computational vertices may also be executed as part of the same or a different process than the local execution environment. Thus, in some cases, the spawned vertex instances may be executed as part of the same process the local environment is running on, or as part of a different process.

As indicated above, the execution of each computational vertex may be monitored by monitor 140. The monitoring may provide a stream of instrumentation information (i.e. monitoring data 141) which is sent to a dataflow visualizer and/or stored in a data store. The local execution environment 110 allows one or more users (e.g. subscribers 152) to subscribe to events 150 and/or debugging information 151 generated as part of the stream of instrumentation information.

In some cases, a subset of events generated as part of the stream of instrumentation information comprises job progress indications indicating execution progress regarding the various computational vertices. Thus, a subscriber may be able to monitor and track execution progress as each computational vertex is executed. Another subset of events generated as part of the stream of instrumentation information may include debugging information for debugging the execution of the job graph. Thus, as the program (job graph) is being executed in the local execution environment, subscribers may receive debugging updates, events, codes, or other requested information as part of debugging information 151. In some embodiments, each subscriber may be able to configure which events he or she wishes to subscribe to and/or indicate which debugging information he or she wishes to receive from the execution monitor.

FIG. 4 illustrates a flowchart of a method 400 for visualizing dataflow of a distributed application in a locally simulated execution environment. The method 400 will now be described with frequent reference to the components and data of environments 100 of FIGS. 1 and 300 of FIG. 3.

Method 400 includes an act of receiving a subscription to receive dataflow process data from a dataflow visualizer, the dataflow visualizer being configured to display various aspects of simulated distributed application execution (act 410). For example, monitor 140 may receive a subscription to receive dataflow process data from dataflow visualizer 360. The dataflow visualizer may be configured to generate various views for display on a display, where the views show different aspects of simulated distributed application execution. The dataflow visualizer includes different visualizers including a stage visualizer 365. The stage visualizer visualizes the job graph 107 as it is initially received at the local execution engine. Developers and other users may desire to see how the job graph looked upon arrival for comparison to later views that may be changed from the original version.

Method 400 includes an act of monitoring dataflow during execution of the distributed application, wherein the distributed application comprises a plurality of computational vertices that correspond to a job graph of the distributed application (act 420). For example, monitor 140 may monitor dataflow during execution of the distributed application (as represented by job graph 107 and graph of vertices 108). This monitored data 341 may be sent to the dataflow visualizer on an ongoing basis, which includes sending the data as the application is being executed.

Method 400 also includes an act of sending the monitored dataflow data to the dataflow visualizer for display, wherein the dataflow data is displayed as the application is being executed (act 430). For example, monitor 140 may send monitoring data 341 to dataflow visualizer 360 for display on display 380, such that the data can be displayed in various forms while the application is being processed. For instance, as mentioned above, the job graph can be displayed in a job graph view 366 which shows the job graph 107 as it was received at the local execution environment.

The dataflow visualizer also includes an executing graph visualizer 370 which displays the following dataflow data (371): the job graph 107 at a particular stage, the computational vertices 108 that have been executed, the computational vertices that are ready to run (as determined by graph manager 120) and the computational vertices that are not ready to run (also as determined by the graph manager). A user may select which stage during execution the job graph is shown. Moreover, the user may select multiple different stages at which they want to view execution of the job graph. Still further, the user (105) can view which computational vertices have been executed, how they were executed, where they were executed, and what the result was of that execution. The user can view how much data was transferred between vertices and how long each vertex took to complete. Furthermore, the user can choose to view which computational vertices are and are not ready for execution at any given time.

In some cases, this dataflow data may be displayed directly on top of the job graph, as part of the job graph or as an overlay. For instance, the dataflow data for each vertex may be displayed on the node links in the graph corresponding to each vertex. Thus, a user can see, for each vertex, various execution details including when and how it was executed and if it has not yet been executed, whether it is ready for execution.

Dataflow visualizer also includes code visualizer 375. The code visualizer displays what is happening in the software code of the computational vertex at each step in the code. Thus, in code view 376, a user or developer can see what is happening at each computational vertex during execution.

Using the monitoring data 141/341, the overall processing resource cost may be predicted for processing the distributed application in a cloud. Thus, based on how many processing resources were used in the simulated local execution environment, an overall processing resource cost can be calculated which would approximate the amount of processing resources that would be needed to distribute the processing of the application over a given distributed system topology. Such an estimate may include estimating the amount of processing time necessary to process a computational vertex, estimating the amount of memory necessary to process the computational vertex, or estimating the amount of data transferred between vertices during an operation. This resource estimate including the estimated processing time and memory amount for the computational vertex may be displayed next to each computational vertex node in the node graph.

Thus, computer systems, methods and computer program products are provided which allow for local simulation of a distributed software application. Moreover, the execution of such distributed software applications may be monitored and visualized in a display. Both the local execution environment and the data visualization are fully customizable by the user and can be tailored to simulate substantially any size of application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for simulating on a local computing environment execution of a software application that is designed for distributed execution among a plurality of different computing systems distributed throughout a network of computing systems so that performance of the software application can be evaluated prior to actual execution in the environment of the distributed network, the computer-implemented method comprising acts of:

instantiating at a local computing environment a simulation architecture for simulating execution of a software application in a distributed network of computing systems, the simulation architecture at the local computing environment comprising:
   a scheduler component;
   a graph manager component;
   a cluster manager component;
   a data manager component;
   a vertex spawner component; and
   a monitor component;

generating for the software application a job graph which includes a graph of computational vertices that are designed to be executed on a plurality of the computing systems in the distributed network;

inputting said job graph to the scheduler component in the simulation architecture of the local computing system;

the scheduler component then querying the following components in the simulation architecture of the local computing system:
   the graph manager component, which, in response to the query, determines which computational vertices of the job graph are ready for execution in a simulation at the local computing system of the computing systems of the distributed network;
   the cluster manager component, which, in response to the query, determines a simulated organizational topology of the simulated computing systems of the distributed network;
   the data manager component, which, in response to the query, determines data storage locations for each of the computational vertices indicated as being ready for execution at the local computing system by the simulated computing systems of the distributed network;

based on the determinations returned to the scheduler component in response to the queries sent to the graph manager component, the cluster manager component and the data manager component, the scheduler component then outputting to the vertex spawner component an instance of each computational vertex that is ready to be spawned for simulated execution at the local computing environment by the simulated computing systems of the distributed network;

at the local computing environment, executing by the simulated computing systems of the distributed network each computational vertex that is spawned; and monitoring and displaying performance data at the local computing system for the simulated execution of the software application.

2. The method of claim 1, wherein the scheduler component is configured to accept third party scheduling logic plug-ins.

3. The method of claim 1, wherein the vertex spawner component creates a directory structure and corresponding execution data for each computational vertex.

4. The method of claim 1, wherein the graph manager component dynamically determines which computational vertices of the job graph are ready for execution in the local execution environment based on available simulated processing, storage and network resources.

5. The method of claim 1, wherein the computational vertices output by the scheduler component are executed concurrently.

6. The method of claim 1, wherein the monitoring of performance data provides a stream of instrumentation information which is stored in a data store.

7. The method of claim 6, wherein the local execution environment allows users to subscribe to events generated as part of the stream of instrumentation information.

8. The method of claim 7, wherein a subset of events generated as part of the stream of instrumentation information comprises job progress indications indicating execution progress regarding the various computational vertices.

9. The method of claim 7, wherein a subset of events generated as part of the stream of instrumentation information comprises debugging information for debugging the execution of the job graph.

10. The method of claim 1, wherein the cluster manager component is configured to simulate different network topologies.

11. The method of claim 1, wherein the data manager component is configured to simulate the positioning of data across different machines.

12. A computer system comprising the following:
    one or more processors;
    system memory;
    one or more computer-readable storage media having stored thereon computer-executable instructions that, when executed by the one or more processors, causes the computing system to perform a method for simulating on a local computing environment execution of a software application that is designed for distributed execution among a plurality of different computing systems distributed throughout a network of computing systems so that performance of the software application can be evaluated prior to actual execution in the environment of the distributed network, the computer-implemented method comprising acts of:
- instantiating at a local computing environment a simulation architecture for simulating execution of a software application in a distributed network of computing systems, the simulation architecture at the local computing environment comprising:
  - a scheduler component;
  - a graph manager component;
  - a cluster manager component;
  - a data manager component;
  - a vertex spawner component; and
  - a monitor component;
- generating for the software application a job graph which includes a graph of computational vertices that are designed to be executed on a plurality of the computing systems in the distributed network;
- inputting said job graph to the scheduler component in the simulation architecture of the local computing system;
- the scheduler component then querying the following components in the simulation architecture of the local computing system:
  - the graph manager component, which, in response to the query, determines which computational vertices of the job graph are ready for execution in a simulation at the local computing system of the computing systems of the distributed network;
  - the cluster manager component, which, in response to the query, determines a simulated organizational topology of the simulated computing systems of the distributed network;
  - the data manager component, which, in response to the query, determines data storage locations for each of the computational vertices indicated as being ready for execution at the local computing system by the simulated computing systems of the distributed network;
- based on the determinations returned to the scheduler component in response to the queries sent to the graph manager component, the cluster manager component and the data manager component, the scheduler component then outputting to the vertex spawner component an instance of each computational vertex that is ready to be spawned for simulated execution at the local computing environment by the simulated computing systems of the distributed network;
- at the local computing environment, executing by the simulated computing systems of the distributed network each computational vertex that is spawned; and
- monitoring and displaying performance data at the local computing system for the simulated execution of the software application.

13. A computer program product comprising one or more computer storage devices containing computer-executable instructions which, when executed, cause a computer system to implement a method for simulating on a local computing environment execution of a software application that is designed for distributed execution among a plurality of different computing systems distributed throughout a network of computing systems so that performance of the software application can be evaluated prior to actual execution in the environment of the distributed network, the computer-implemented method comprising acts of:
- instantiating at a local computing environment a simulation architecture for simulating execution of a software application in a distributed network of computing systems, the simulation architecture at the local computing environment comprising:
  - a scheduler component;
  - a graph manager component;
  - a cluster manager component;
  - a data manager component;
  - a vertex spawner component; and
  - a monitor component;
- generating for the software application a job graph which includes a graph of computational vertices that are designed to be executed on a plurality of the computing systems in the distributed network;
- inputting said job graph to the scheduler component in the simulation architecture of the local computing system;
- the scheduler component then querying the following components in the simulation architecture of the local computing system:
  - the graph manager component, which, in response to the query, determines which computational vertices of the job graph are ready for execution in a simulation at the local computing system of the computing systems of the distributed network;
  - the cluster manager component, which, in response to the query, determines a simulated organizational topology of the simulated computing systems of the distributed network;
  - the data manager component, which, in response to the query, determines data storage locations for each of the computational vertices indicated as being ready for execution at the local computing system by the simulated computing systems of the distributed network;
- based on the determinations returned to the scheduler component in response to the queries sent to the graph manager component, the cluster manager component and the data manager component, the scheduler component then outputting to the vertex spawner component an instance of each computational vertex that is ready to be spawned for simulated execution at the local computing environment by the simulated computing systems of the distributed network;
- at the local computing environment, executing by the simulated computing systems of the distributed network each computational vertex that is spawned; and
- monitoring and displaying performance data at the local computing system for the simulated execution of the software application.

14. The computer program product of claim 13, wherein the scheduler component is configured to accept third party scheduling logic plug-ins.

15. The computer program product of claim 13, wherein the vertex spawner component creates a directory structure and corresponding execution data for each computational vertex.

16. The computer program product of claim 13, wherein the graph manager component dynamically determines which computational vertices of the job graph are ready for execution in the local execution environment based on available simulated processing, storage and network resources.

17. The computer program product of claim 13, wherein the computational vertices output by the scheduler component are executed concurrently.

18. The computer program product of claim 13, wherein the monitoring of performance data provides a stream of instrumentation information which is stored in a data store.

19. The computer program product of claim 18, wherein the local execution environment allows users to subscribe to events generated as part of the stream of instrumentation information.

20. The computer program product of claim 19, wherein a subset of events generated as part of the stream of instrumentation information comprises job progress indications indicating execution progress regarding the various computational vertices.

21. The computer program product of claim 19, wherein a subset of events generated as part of the stream of instrumentation information comprises debugging information for debugging the execution of the job graph.

22. The computer program product of claim 13, wherein the cluster manager component is configured to simulate different network topologies.

23. The computer program product of claim 13, wherein the data manager component is configured to simulate the positioning of data across different machines.

\* \* \* \* \*